United States Patent
Kang et al.

(10) Patent No.: US 10,676,583 B2
(45) Date of Patent: Jun. 9, 2020

(54) SOFT POLYURETHANE FOAM USING HYDROCARBON POLYOL, AND COSMETIC COMPRISING SAME

(71) Applicant: LG HOUSEHOLD & HEALTH CARE LTD., Seoul (KR)

(72) Inventors: Sung-Soo Kang, Daejeon (KR); Sang-Wook Park, Daejeon (KR); Kyong-Seob Kim, Daejeon (KR); Sang-Hyub Lee, Daejeon (KR); Se-Ra Shin, Daejeon (KR)

(73) Assignee: LG HOUSEHOLD & HEALTH CARE LTD., Seoul (KR)

( * ) Notice: Subject to any disclaimer, the term of this patent is extended or adjusted under 35 U.S.C. 154(b) by 255 days.

(21) Appl. No.: 15/566,127

(22) PCT Filed: Nov. 16, 2015

(86) PCT No.: PCT/KR2015/012288
§ 371 (c)(1),
(2) Date: Oct. 12, 2017

(87) PCT Pub. No.: WO2016/167435
PCT Pub. Date: Oct. 20, 2016

(65) Prior Publication Data
US 2018/0086889 A1    Mar. 29, 2018

(30) Foreign Application Priority Data

Apr. 13, 2015  (KR) .................. 10-2015-0051752
Nov. 13, 2015  (KR) .................. 10-2015-0159751

(51) Int. Cl.
C08G 18/32     (2006.01)
C08J 9/22      (2006.01)
(Continued)

(52) U.S. Cl.
CPC ............... *C08J 9/22* (2013.01); *A45D 34/04* (2013.01); *C08F 283/008* (2013.01);
(Continued)

(58) Field of Classification Search
CPC .............. C08G 18/341; C08G 18/3206–3215
See application file for complete search history.

(56) References Cited

U.S. PATENT DOCUMENTS 4,202,950 A   5/1980  Statton
6,063,825 A   5/2000  Isobe et al.
(Continued)

FOREIGN PATENT DOCUMENTS

DE   19739778 A1   3/1998
EP    2837375 A1   2/2015
(Continued)

OTHER PUBLICATIONS

Machine translation of JP 2009-167255 by Nakane et al (Year: 2009).*

(Continued)

*Primary Examiner* — Michael M Dollinger
*Assistant Examiner* — Christina H. W. Rosebach
(74) *Attorney, Agent, or Firm* — Birch, Stewart, Kolasch & Birch, LLP (57) ABSTRACT

The present invention provides a composition for a soft urethane foam to prepare a soft urethane foam, comprising a polyol, and a foamed soft urethane foam using the same, wherein the polyol is any one selected from among a hydrocarbon polyol, a vegetable oil, and a vegetable-oil-derived dimer acid, or a mixture of a hydrocarbon polyol with any one selected from among a vegetable oil and a vegetable-oil-derived dimer acid. The present invention provides an impregnation material for impregnation of a cosmetic composition, which can control the polarity of the
(Continued)

impregnation material for impregnating a hydrophilic cosmetic composition, and an impregnation-use urethane foam composition for preparing the same.

8 Claims, 1 Drawing Sheet

(51) Int. Cl.

| | |
|---|---|
| *C08G 18/16* | (2006.01) |
| *C08G 18/24* | (2006.01) |
| *C08G 18/86* | (2006.01) |
| *C08G 18/65* | (2006.01) |
| *C08G 18/36* | (2006.01) |
| *C08G 18/20* | (2006.01) |
| *C08G 18/76* | (2006.01) |
| *C08F 283/00* | (2006.01) |
| *C08G 18/66* | (2006.01) |
| *C08G 18/69* | (2006.01) |
| *A45D 34/04* | (2006.01) |
| *C08J 3/24* | (2006.01) |
| *C08L 75/04* | (2006.01) |
| *C08G 101/00* | (2006.01) |

(52) U.S. Cl.
CPC ....... *C08G 18/165* (2013.01); *C08G 18/2081* (2013.01); *C08G 18/244* (2013.01); *C08G 18/32* (2013.01); *C08G 18/3206* (2013.01); *C08G 18/36* (2013.01); *C08G 18/6576* (2013.01); *C08G 18/6629* (2013.01); *C08G 18/692* (2013.01); *C08G 18/7621* (2013.01); *C08G 18/86* (2013.01); *C08J 3/242* (2013.01); *C08L 75/04* (2013.01); *A45D 2200/1036* (2013.01); *C08G 2101/005* (2013.01); *C08G 2101/0008* (2013.01); *C08G 2101/0083* (2013.01); *C08J 2203/06* (2013.01); *C08J 2203/10* (2013.01); *C08J 2205/06* (2013.01); *C08J 2300/104* (2013.01)

(56) References Cited

U.S. PATENT DOCUMENTS

| | | | |
|---|---|---|---|
| 9,623,143 B2* | 4/2017 | Zugates | A61L 24/0015 |
| 2004/0170670 A1 | 9/2004 | Smith et al. | |
| 2012/0316255 A1* | 12/2012 | Kabu | C08G 18/4887 521/158 |
| 2014/0154295 A1 | 6/2014 | Sim et al. | |
| 2015/0104235 A1* | 4/2015 | Choi | A61Q 17/04 401/119 |

FOREIGN PATENT DOCUMENTS

| | | | |
|---|---|---|---|
| JP | 2012-224712 A | 11/2012 | |
| JP | 2015-063660 A | 4/2015 | |
| KR | 10-1999-0023688 A | 3/1999 | |
| KR | 10-2013-0001688 A | 1/2013 | |
| WO | WO-2013154395 A1 * | 10/2013 | A61Q 17/04 |

OTHER PUBLICATIONS

Brydson, J.A. "Aliphatic Polyolefins other than Polyethylene, and Diene Rubbers". in Plastics Materials (Seventh Edition), 1999. (Year: 1999).*
International Search Report (PCT/ISA/210) issued in PCT/KR2015/012288, dated Mar. 2, 2016.
John et al., "Characterization of Polyurethane Foams from Soybean Oil", Journal of Applied Polymer Science, vol. 86, (2002), pp. 3097-3107.
Kong et al., "Physical Properties of Polyurethane Plastic Sheets Produced from Polyols from Canola Oil", Biomacromolecules, (2007), vol. 8, No. 7, pp. 2203-2209.
Petrović, Z.S. "Polyurethanes from Vegetable Oils", Polymer Reviews, 2008, 48(1), pp. 109-155.

* cited by examiner

SOFT POLYURETHANE FOAM USING HYDROCARBON POLYOL, AND COSMETIC COMPRISING SAME

TECHNICAL FIELD

The present application claims priority to Korean Patent Application No. 10-2015-0051752 filed on Apr. 13, 2015 and Korean Patent Application No. 10-2015-0159751 filed on Nov. 13, 2015, the disclosures of which are incorporated herein by reference.

The present disclosure relates to a polyurethane foam and a cosmetic product containing the same, more particularly to a soft polyurethane foam wherein the polarity of the polyurethane foam can be controlled easily and a cosmetic product containing the same.

BACKGROUND ART

In general, a polyurethane foam is obtained by reacting a resin premix which is prepared from a polyol, a catalyst for preparation of a polyurethane foam, a foaming agent, etc. with a polyisocyanate.

The polyurethane foam is widely used as an insulating material in electric refrigerators, freezers, cold storage warehouses, construction panels, etc. due to its superior insulating performance, moldability and self-adhesivity and in automobile interior parts such as seat cushions, seat backs, head rests, arm rests, instrument panels, door trims, ceiling materials, etc., saddles of motorcycles, seats for airplanes and trains and cushioning materials of furniture, bedding, chairs, etc. due to superior cushioning property.

In general, a petroleum-based synthetic polyol is mainly used for the preparation of a urethane foam. There have been many efforts to prepare ecofriendly polyurethanes by replacing the petroleum-based polyol with a vegetable oil-based natural polyol (Petrovic, Z. S., "Polyurethanes from Vegetable Oils," *Polym. Rev.*, 48(1), 109-155 (2008); Kong, X., and Narine, S. S., "Physical Properties of Polyurethane Plastic Sheets Produced from Polyols from Canola Oil," *Biomacromolecules*, 8(7), 2203-2209 (2007); etc.). However, the urethane foams prepared from vegetable oils are mostly hard urethane foams and preparation of soft urethane foams using vegetable oils have not been studied enough. Although synthesis of soft foams only from a soybean oil-based polyol was reported, a lot of closed cells were observed (J. John, M. Bhattacharya, and R. B. Turner, Characterization of polyurethane foams from soybean oil, *J. Appl. Polym. Sci.*, 86, 3097 (2002).)

The soft polyurethane foam is utilized in various industrial applications such as packaging due to superior elasticity and mechanical strength (elongation, tensile strength and wear resistance) owing to its open cell structure.

Recently, as cosmetic products in which a cosmetic composition is impregnated in a urethane foam, such as cushion pacts, cushion cosmetics, are appraised as revolutionary products, interests in the soft urethane foam are increasing in the cosmetic product industry.

The urethane foam which is prepared from a polyol, a multifunctional isocyanate, a foaming agent, etc. may have various properties depending on the polyol. A soft urethane foam sponge is prepared from a polyol with a relatively large molecular weight. Polyether- and polyester-based polyols are mainly used.

As a urethane foam for impregnating a cosmetic composition, the ether-type polyurethane foam is usually used. However, the ether-type polyurethane foam is disadvantageous in terms of tensile strength, hardness, elongation and flame retardancy as compared to the ester-type polyurethane using a polyol containing ester linkages. The ester-type polyurethane foam has a uniform cell structure and is resistant against oxidation due to superior chemical resistance. However, it is known to have weak water resistance because it is hydrolyzed unlike the ether-type polyurethane foam. For this reason, its use for impregnating a cosmetic composition is extremely limited.

There have been efforts to select a suitable urethane foam impregnating material by mixing an ether-based polyol with an ester-based polyol according to the physical properties and ingredients of a cosmetic composition. However, there is a problems in that the polyols do not have good compatibility.

Although polarity can be controlled to some extent by controlling the compositional ratio of the isocyanate and other additives used in the preparation of the polyurethane foam, there is a limitation in controlling the polarity variously according to the physical properties of the cosmetic composition.

DISCLOSURE

Technical Problem

The present disclosure is designed to solve the problems and is directed to providing a soft urethane foam which has improved durability and can be used without deformation.

The present disclosure is also directed to providing a novel soft urethane foam that can be used variously in the cosmetic product industry.

The present disclosure is also directed to providing a novel impregnating material for impregnating a cosmetic composition and a cosmetic product containing the same.

The present disclosure is also directed to providing an impregnating material for impregnating a cosmetic composition, which is advantageous for impregnation of a lipophilic cosmetic composition, and a cosmetic product containing the same.

The present disclosure is also directed to providing a method for controlling the polarity of an impregnating material according to the kind of a cosmetic composition and an impregnating material for impregnating a cosmetic composition prepared by using the same.

Technical Solution

In order to solve the problems described above, the inventors of the present disclosure provide a composition for preparing a soft urethane foam by using a hydrocarbon polyol. In general, a vegetable oil-based polyol used for preparing a foam has a molecular weight of 1000 g/mol or smaller, which is so small to be prepared into a soft foam and is also disadvantageous in that many closed cells are generated because cell opening is difficult due to increased crosslinking density. In order to solve this problem, the inventors of the present disclosure have researched for a long time to prepare a urethane foam using a polyol including a vegetable oil and to prepare a soft urethane foam in which an open cell structure is formed easily and have completed the present disclosure.

In an exemplary embodiment, the present disclosure provides a soft urethane foam composition using a vegetable oil or a dimer acid derived from a vegetable oil and a soft urethane foam using the composition. Specifically, in another exemplary embodiment, the present disclosure provides a soft urethane foam composition for a cosmetic product, using a vegetable oil or a dimer acid derived from a vegetable oil, and a soft urethane foam using the composition. Specifically, the present disclosure provides a soft urethane foam composition containing one or more selected from a group consisting of a hydrocarbon polyol, a vegetable oil or a dimer acid derived from a vegetable oil. Specifically, the present disclosure provides an impregnating material for impregnating a cosmetic composition, prepared using the composition for preparing a urethane foam, and a cosmetic product containing the impregnating material.

The inventors of the present disclosure have completed the present disclosure after consistent efforts to develop a soft urethane foam having the advantages of both an ester-type urethane foam and an ether-type urethane foam. In particular, the inventors of the present disclosure have found out that impregnation efficiency can be affected by the physical properties of a cosmetic composition impregnated in an impregnating material and have made efforts to develop a urethane foam impregnating material capable of overcoming the difficulty of mixing an ether polyol and an ester polyol due to poor compatibility of the polyols.

The inventors of the present disclosure have developed a soft urethane foam using a novel type of polyol that has never been attempted in the cosmetic product industry.

Although there have been attempts to prepare a foam by including a vegetable oil in a composition for preparing a urethane foam as a polyol, it could be hardly used to prepare a soft urethane foam due to high crosslinking density and generation of a lot of closed cells. However, a urethane foam prepared according to the present disclosure has an open cell structure and, thus, is advantageous in preparing a soft urethane foam.

Specifically, the soft urethane foam is used in industrial and household cleaning appliances, furniture such as sofa and bed, automobile parts, oil absorbents, sound-absorbing materials, etc. In particular, in the cosmetic product industry, it is used for application puffs, packaging and packing materials, facewashing appliances, etc. Particularly, it may be specifically used as an impregnating material for impregnating a cosmetic composition.

In the cosmetic product industry, there is a limitation in selecting a polyol for preparing a urethane foam for impregnating a cosmetic composition because a cosmetic product containing both aqueous and oil components should be impregnated, the impregnating material should be pressed constantly using an applicator, a predetermined shape should be maintained despite compression or pressure from outside and the impregnating material should be able to resist wearing or disintegration. However, the inventors of the present disclosure have developed a polyol for preparing a urethane foam for impregnating a cosmetic composition that can satisfy all the conditions.

The present disclosure provides a soft urethane foam composition for preparing a soft urethane foam, containing a polyol, wherein the polyol is any one selected from i) a hydrocarbon polyol, ii) any one selected from a vegetable oil and a dimer acid derived from a vegetable oil and iii) a mixture of a hydrocarbon polyol with any one selected from a vegetable oil and a dimer acid derived from a vegetable oil. Specifically, the polyol may contain a hydrocarbon polyol and a vegetable oil together.

In an exemplary embodiment of the present disclosure, the polyol containing a hydrocarbon polyol and a vegetable oil together may contain the vegetable oil in an amount of less than 50 wt %, specifically less than 45 wt %, and more specifically less than 42 wt %, based on the total weight of the polyol contained in the composition.

When the polyol contains the hydrocarbon polyol and the vegetable oil together, if the content of the vegetable oil exceeds 50 wt %, compatibility between the polyols is not good and a soft urethane foam is not formed stably.

In an exemplary embodiment of the present disclosure, the hydrocarbon polyol, the vegetable oil or the dimer acid derived from a vegetable oil may have a carbon-carbon double bond and all or part of the double bond may be modified by an addition reaction.

The modified double bond may be a double bond present in a side chain rather than in a main chain.

As used herein, the term 'modification' refers to induction of crosslinking or graft polymerization by adding an addition reaction initiator or a monomer such as a vinyl monomer, an acryl monomer, an acryl ester monomer, etc. to a carbon-carbon double bond.

In the present disclosure, the term 'main chain' is used as the same meaning as generally recognized in the art. In the present disclosure, it refers to bonds forming the backbone of a hydrocarbon polyol, a vegetable oil, a dimer acid derived from a vegetable oil, etc. and means a carbon-rich hydrocarbon chain.

As used herein, the term 'side chain' refers to bonds branching from a main chain.

The hydrocarbon polyol may have 2-10 hydroxy functional groups and a number-average molecular weight of 100-100,000 g/mol, specifically 300-50,000 g/mol, more specifically 500-10,000 g/mol. When the molecular weight of the hydrocarbon polyol is smaller than 100 g/mol, elasticity may be lost. And, when it exceeds 100,000 g/mol, it may be difficult to prepare a desired foam due to high viscosity at room temperature.

Specifically, the hydrocarbon polyol contained in the composition for preparing a soft urethane foam of the present disclosure may be any polybutadiene polyol selected from a group consisting of cis-1,4-polybutadiene polyol, trans-1,4-polybutadiene polyol, 1,2-polybutadiene polyol and a mixture thereof. Most specifically, a cis-1,4-polybutadiene polyol/trans-1,4-polybutadiene polyol/1,2-polybutadiene polyol mixture may be used.

The vegetable oil may include castor oil, soybean oil, sunflower oil, safflower seed oil, olive oil, rapeseed oil, etc. If necessary, modified rapeseed oil having hydroxyl groups introduced, modified sunflower oil having hydroxyl groups introduced, etc. may be used. Specifically, the vegetable oil may be castor oil. The castor oil is rich in the main ingredient linoleic acid and can be modified variously due to the presence of triglycerides, double bonds and many hydroxyl groups like other vegetable oils. Specifically, it may be advantageous in preparing the soft urethane foam of the present disclosure because it does not require introduction of hydroxyl groups for use as a polyol and has a large molecular weight, unlike other vegetable oils.

The dimer acid derived from a vegetable oil may be derived from waste cooking oil, safflower seed oil, tall oil, fish oil, rapeseed oil, olive oil, etc. For example, dimer acids having 36 or more carbon atoms, trimer acids having 54 or more carbon atoms or non-conjugated dimer acids obtained from thermal polymerization of dienes in a vegetable oil may be used.

These compounds are generally known substances. For example, a dimer acid derived from a vegetable oil, represented by Chemical Formula 1, may be used in the present disclosure.

[Chemical Formula 1]

wherein each of $R_1$ and $R_2$ represents a $C_4$-$C_8$ linear alkylene group and each of $R_3$ and $R_4$ represents a $C_4$-$C_8$ linear alkyl group.

In another exemplary embodiment of the present disclosure, the hydrocarbon polyol, the vegetable oil or the dimer acid derived from a vegetable oil of the present disclosure may have a carbon-carbon double bond and all or part of the double bond may be modified by an addition reaction.

The modification may be performed through crosslinking between polymers or through graft polymerization by adding any one selected from a group consisting of a vinyl monomer, an acryl monomer and an acryl ester monomer.

Figure 1:
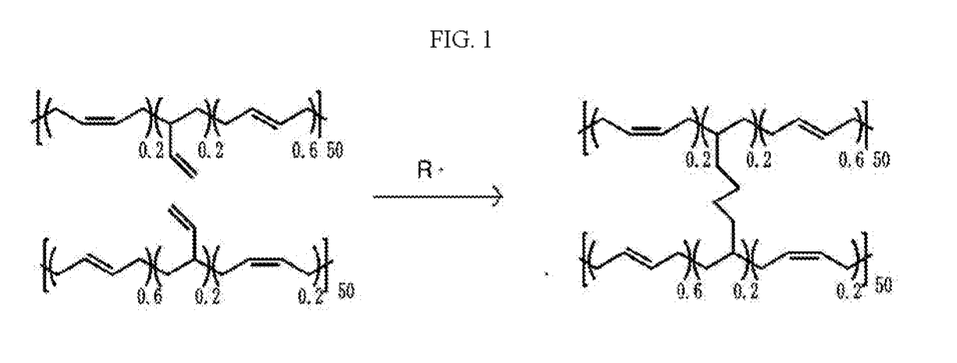
FIG. 1 shows a reaction scheme wherein the double bonds of polybutadiene segments of polybutadiene polyol as a representative hydrocarbon polyol are crosslinked by a radical initiator.

For example, crosslinkages between the double bonds of the polybutadiene polyol may be formed by the addition reaction initiator, as can be seen from FIG. 1.

Figure 2:
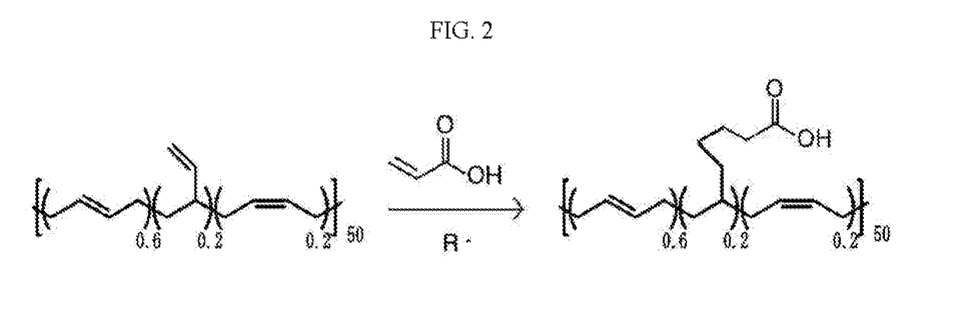
FIG. 2 shows a reaction scheme wherein the double bonds of polybutadiene segments of polybutadiene polyol as a representative hydrocarbon polyol are grafted by acrylic acid as one of acryl monomers in the presence of a radical initiator.
Figure 3:
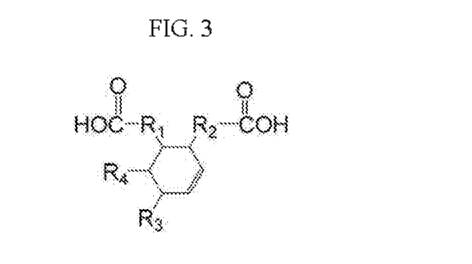
FIG. 3 presents Chemical Formula 1 of the present disclosure.

As another example, the double bonds of the polybutadiene polyol may be grafted by adding acrylic acid as an acryl monomer, as can be seen from FIG. 2.

The above description given with reference to FIG. 1 and FIG. 2 only illustrates exemplary embodiments of the present disclosure and the present disclosure is not limited to FIG. 1 and FIG. 2.

Specifically, the foam prepared using the composition for preparing a foam, containing the hydrocarbon polyol and the vegetable oil (or the dimer acid derived from a vegetable oil) together may allow easy control of the polarity of a cosmetic composition when the cosmetic composition is impregnated in the foam.

The addition reaction initiator is not particularly limited and various examples such as a radical reaction initiator such as a peroxide, a peroxyester, an azo compound, etc., a cationic initiator such as boron trifluoride, etc. may be used.

For example, any initiator selected from a group consisting of benzoyl peroxide, t-butyl peroxybenzoate, t-amyl peroxy-2-ethylhexanoate, t-butyl peroxypivalate, t-amyl peroxypivalate, di-(2-ethylhexyl) peroxydicarbonate, di-n-propyl peroxydicarbonate, di-sec-butyl peroxydicarbonate, 3-hydroxy-1,1-dimethylbutyl peroxyneodecanoate, 3-hydroxy-1,1-dimethylbutyl peroxyneoheptanoate, t-amyl peroxyneodecanoate, 2,5-dimethyl-2,5-di-(2-ethylhexanoylperoxy)hexane, diisononanoyl peroxide, dodecanoyl peroxide, dioctanoyl peroxide, t-butyl peroxyneodecanoate, t-butyl perbenzoate, 1,1-dimethyl-3-hydroxybutyl peroxy-2-ethylhexanoate, benzoyl peroxide, 1,1,3,3-tetramethylbutyl peroxypivalate, di-(3,5,5-trimethylhexanoyl) peroxide, 1,1,3,3-tetramethylbutyl peroxy-2-ethylhexanoate, azobisisobutyronitrile, 2,2'-azobis-(2-methoxybutyronitrile) and a mixture thereof may be used.

In addition, a protonic acid, a Lewis acid or an easily ionizable compound may be used. As specific examples, $H_2SO_4$, $HClO_4$, HCl, $BF_3$, $BCl_3$, $BF_3$:$O(C_2H_5)_2$, $TiCl_4$, $AlCl_3$, $AlBr_3$, $SnCl_4$, etc. may be used. Also, various onium salts such as ammonium salts, phosphonium salts, sulfonium salts, etc., methyltriphenylphosphonium bromide, ethyltriphenylphosphonium bromide, phenyltriphenylphosphonium bromide, etc. may be used without limitation. These initiators may also be added in various combinations and also may be used together with the various radical initiators described above.

In another exemplary embodiment of the present disclosure, one or more selected from a group consisting of a vinyl monomer, an acryl monomer and an acryl ester monomer may be added to the double bond of the vegetable oil or the dimer acid derived from a vegetable oil.

For example, any one selected from a group consisting of: a carboxyl group-containing vinyl monomer selected from a group consisting of acrylic acid, methacrylic acid, carboxyethyl acrylate, carboxypentyl acrylate, itaconic acid, maleic acid, fumaric acid and crotonic acid; an acid anhydride vinyl monomer selected from a group consisting of maleic anhydride and itaconic anhydride; a hydroxyl group-containing vinyl monomer selected from a group consisting of hydroxyethyl acrylate, hydroxyethyl methacrylate, hydroxypropyl acrylate, hydroxypropyl methacrylate, hydroxybutyl acrylate, hydroxybutyl methacrylate, hydroxyhexyl acrylate and hydroxyhexyl methacrylate; an N-substituted amide-based vinyl monomer selected from a group consisting of N,N-dimethylacrylamide and N,N-dimethylmethacrylamide; an alkoxyalkyl acrylate vinyl monomer selected from a group consisting of methoxyethyl acrylate, methoxyethyl methacrylate, ethoxyethyl acrylate and ethoxyethyl methacrylate; a vinyl monomer selected from a group consisting of vinyl acetate, vinyl propionate, N-vinylpyrrolidone, methylvinylpyrrolidone, vinylpyridine, vinylpiperidone, vinylpyrimidine, vinylpiperazine, vinylpyrazine, vinylpyrrole, vinylimidazole, vinyloxazole, vinylmorpholine, N-vinylcarbonamide, styrene, α-metylstyrene and N-vinylcaprolactam; a cyanoacrylate vinyl monomer selected from a group consisting of acrylonitrile and methacrylonitrile; an epoxy group-containing acryl monomer selected from a group consisting of glycidyl acrylate and glycidyl methacrylate; a glycol-based acryl ester monomer selected from a group consisting of polyethylene glycol acrylate, polyethylene glycol methacrylate, polypropylene glycol acrylate, polypropylene glycol methacrylate, methoxyethylene glycol acrylate, methoxypolyethylene glycol methacrylate, methoxypolypropylene glycol acrylate and methoxypolypropylene glycol methacrylate; or a mixture thereof may be used.

The composition for preparing a foam of the present disclosure may further contain, in addition to the any one selected from a group consisting of a hydrocarbon polyol, a vegetable oil or a dimer acid derived from a vegetable oil, a foaming agent, a surfactant, a catalyst and an isocyanate compound necessary for preparing a polyurethane foam.

As the foaming agent, a chemical foaming agent such as water, a hydroxyfluorocarbon (HFC-245fa, etc.), a hydrocarbon (cyclopentane, etc.) or a physical foaming agent such as carbon dioxide, liquefied carbon dioxide, dichloromethane, etc. may be used. Among them, water, carbon dioxide, liquefied carbon dioxide are advantageous when considering the purpose of the present disclosure. Most specifically, water may be used as the foaming agent according to the present disclosure, although a physical foaming agent such as liquefied carbon dioxide, etc. may also be used. When water is used as the foaming agent, it may be contained in an amount of specifically 1.3-6.5 parts by weight, more specifically 1.5-6.0 parts by weight, more specifically 1.8-5.5 parts by weight, most specifically 2.0-5.0 parts by weight, based on 100 parts by weight of the total polyol component. When the amount of water as the foaming agent is within the above-described range, foaming is achieved stably and effectively.

As the surfactant, a previously known surfactant may be used. Specifically, a commonly used organosilicon-based surfactant may be used, although not being particularly limited thereto. For example, Dow Corning Toray Silicone Co. Ltd.'s FV-1013-16, SRX-274C, SF-2969, SF-2961, SF-2962, L-3601, SZ-1325 and SZ-1328, Momentive's L-5309, L-5307, L-3600, L-5366, L-580 and Y-10366, Air Products' DC-2525 and DC-6070, Evonik's B-8715, B-8742 and B-8450, or the like may be used specifically. The surfactant may be contained in an amount of specifically 0.1-10 parts by weight, more specifically 0.5-5 parts by weight, based on 100 parts by weight of the total polyol component.

As the catalyst, any catalyst used in the art to prepare a polyurethane foam may be used. For example, an aliphatic amine such as triethylenediamine, bis(2-dimethylaminoethyl)ether, 1-isobutyl-2-metylimidazole, morpholino, etc., an organotin compound such as stannous octoate, dibutyltin dilaurate, etc., or the like may be used specifically. These catalyst may be used either alone or in combination.

The polyol mixture is mixed with the isocyanate compound to prepare the urethane foam of the present disclosure. The isocyanate compound may be one or more selected from a group consisting of tolylene diisocyanate (TDI), diphenylmethane diisocyanate (MDI), naphthalene diisocyanate (NDI), xylylene diisocyanate (XDI), isophorone diisocyanate (IPDI), hexamethylene diisocyanate (HMDI) and a derivative thereof.

The composition for preparing polyurethane of the present disclosure may further contain other ingredients generally used in the art. Examples may include a cell stabilizer, a crossliking agent, a chain extender, a flame retardant, a filler, an auxiliary urethane gelling catalyst, a transition metal catalyst, etc. Any specific examples of these ingredients known in the art may be contained in the composition.

In an exemplary embodiment of the present disclosure, the soft urethane foam may be prepared by the following method.

A method for preparing a urethane foam commonly employed in the art may be used without being limited to the following description. The following preparation method is given only as an example of the method for preparing a polyurethane foam of the present disclosure.

The preparation method may include: (S1) a step of mixing a hydrocarbon polyol, a vegetable oil or a dimer acid derived from a vegetable oil with an additive such as water as a chemical foaming agent, a physical foaming agent, a silicone surfactant, an amine or an organometal compound as a reaction catalyst, a radical-generating compound, a vinyl monomer or an acryl monomer as an initiator for crosslinking or grafting of polybutadiene; (S2) a step of mixing the resulting polyol mixture with an isocyanate compound generating polyurethane by reacting with the mixture; and (S3) a step of subjecting the mixture resulting from the step (S2) to foaming at room temperature to 100° C. or higher, gelling and then curing.

In an exemplary embodiment, the present disclosure provides a cosmetic product: including a polyurethane foam for impregnating a cosmetic composition, which contains one or more selected from a group consisting of a hydrocarbon polyol, a vegetable oil or a dimer acid derived from a vegetable oil, and a cosmetic composition impregnated in the polyurethane foam.

The present disclosure provides a use of a polyurethane foam prepared using one or more polyol selected from a group consisting of a hydrocarbon polyol, a vegetable oil or a dimer acid derived from a vegetable oil as an impregnating material for impregnating a cosmetic composition.

In the present disclosure, the impregnating material may be used to impregnate a liquid composition, specifically a cosmetic composition.

In the present disclosure, the term impregnation is used as a meaning generally used in the cosmetic product industry. Specifically, it refers to storage of a content in a material having pores formed therein such as a sponge.

The storage means the ability of holding and storing any substance (for example, including not only a liquid or gel-type cosmetic composition but also a high-viscosity cosmetic composition).

For example, the substance may be a liquid substance having fluidity such as a perfume, a liquid detergent (for dishwashing or laundry), although not being specially limited thereto.

Also, a cosmetic composition having fluidity may be stored inside the impregnating material and may be used as a cosmetic product allowing the cosmetic composition to be applied onto the skin using a separate tool, although not being necessarily limited thereto.

The cosmetic composition having fluidity may include a skin toner, a lotion, a cream, a gel, a liquid foundation, a gel-type foundation, etc., although not being necessarily limited thereto.

In the cosmetic product including the impregnating material of the present disclosure, a lipophilic cosmetic composition having an outer oil phase may be impregnated in a polyurethane foam using a hydrocarbon polyol modified by forming crosslinkages between the double bonds of the hydrocarbon polyol using an addition reaction initiator.

In the present disclosure, the term "outer phase" may refer to the part of a cosmetic composition which is mainly in contact with an impregnating material when it is impregnated in the impregnating material. For example, for a cosmetic composition consisting of a single phase (i.e., a single water phase or a single oil phase), the single phase is an outer phase. The outer phase of a water-in-oil emulsion is an oil phase and the outer phase of an oil-in-water is a water phase. For a multiple emulsion '(X)/(X)$_n$/Y' (wherein 'X' and 'Y' may be a water phase ('W') or an oil phase ('O') and 'n' is 1 or greater), the 'Y' is an outer phase. For example, in an oil-in-water-in-oil emulsion ($O_1$/W/$O_2$), the outer phase may be an 'oil phase ($O_2$)'.

The cosmetic product may be obtained by impregnating a cosmetic composition in a soft polyurethane foam formed by foaming a hydrocarbon polyol modified by forming partial crosslinkages between the double bonds of the hydrocarbon polyol using an addition reaction initiator. The viscosity of the cosmetic composition is not particularly limited as long as it can be impregnated. For example, the cosmetic composition may have a viscosity of 1,000-10,000 cPs.

In another exemplary embodiment, the cosmetic product may be obtained by impregnating a cosmetic composition in a soft polyurethane foam formed by foaming a hydrocarbon polyol modified by adding one or more monomer selected from a group consisting of a vinyl monomer and an acryl monomer to the double bonds of the hydrocarbon polyol. The viscosity of the cosmetic composition is not particularly limited as long as it can be impregnated. For example, the cosmetic composition may have a viscosity of 1,000-10,000 cPs.

Advantageous Effects

The present disclosure provides a composition for preparing a urethane foam, which is useful in preparing a soft urethane foam.

The present disclosure can be advantageously applied to a cosmetic puff, applicator, etc. used in the cosmetic product industry due to strong corrosion resistance.

The present disclosure allows utilization of the superior characteristics of both the ester-based urethane foam and the ether-based urethane foam. The present disclosure alleviates the problem that the control of physical and chemical properties is limited due to poor compatibility between the polyols used for preparing the ester- and ether-based foams.

Because the soft urethane foam of the present disclosure has a superior oil-adsorbing ability, it may be used as an oil adsorbent when marine oil spill occurs.

The present disclosure provides an impregnating material for impregnating a cosmetic composition, which is advantageous in impregnating a lipophilic cosmetic composition.

The present disclosure provides a method for preparing an impregnating material for impregnating a cosmetic composition, wherein the polarity of the impregnating material can be controlled for impregnation of a hydrophilic cosmetic composition.

The present disclosure can solve the swelling problem of an impregnating material which may occur when a cosmetic composition is impregnated.

The present disclosure improves the durability of an impregnating material and allows use of the impregnating material without deformation or corrosion.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications can be made thereto without departing from the scope of the disclosure.

[Preparation of Soft Polyurethane Foam]

Example 1

Modification of Polyol

A hydrocarbon polyol can be modified by performing grafting of a vinyl monomer or an acryl monomer before preparation of a foam or by performing crosslinking or grafting during the preparation of a foam.

(1) Grafting of Vinyl Monomer or Acryl Monomer Before Preparation of Foam

Polybutadiene polyol with a number-average molecular weight of 2,800 g/mol was modified by adding methacrylic acid to the polybutadiene polyol using benzoyl peroxide as an addition reaction initiator. Based on the total weight of the polyol, the content of the initiator was 0.2% and the addition amount of the methacrylic acid was 2%. The modification was performed at 80° C. for 6 hours.

(2) Crosslinking or Grafting During Preparation of Foam

A polybutadiene polyol-based polyurethane foam was modified during foaming of the polyurethane foam by adding methacrylic acid to polybutadiene polyol with a number-average molecular weight of 2,800 g/mol using t-butyl perbenzoate as an addition reaction initiator. Based on the total weight of the polyol, the content of the initiator was 0.2% and the addition amount of the methacrylic acid was 2%.

Example 2

Foaming of Polyurethane Foam Using Polybutadiene-Based Hydrocarbon Polyol and Castor Oil A soft polyurethane foam can be prepared using polybutadiene-based hydrocarbon polyol (0.2/0.6/0.2 (w/w) mixture of cis-1,4-polybutadiene polyol/trans-1,4-polybutadiene polyol/1,2-polybutadiene polyol) having a molecular weight 2,800 g/mol and having 2.5 functional groups and castor oil as follows. First, the polyol and castor oil are mixed as described in Table 1 at room temperature and then prepared into a sufficiently uniform state by stirring. Vacuum degassing and drying are conducted to remove gases included during the stirring of the mixture and water that may affect the reaction of polyurethane. A catalyst, a surfactant and a foaming agent are added to the obtained polyol mixture as described in the following table and then stirred at high speed for about 10 seconds. Then, after adding a weighed isocyanate compound (toluene diisocyanate (TDI T-80/T-65/T-100) and stirring at high speed for 10 seconds, the mixture is injected into a mold. During foaming, the time when the rise in height due to foaming stops (rise time: RT) and the time when fluidity is lost and strength is increased due to gelation (gelation time: GT) are checked to investigate the progress of the reaction. The obtained foam is kept at room temperature for 24 hours and then cut to suit the desired purpose. If necessary, the foam may be reticulated through an additional process.

The mixing ratios and characteristics of the foam are described in Table 1. The content is given in wt % unit.

TABLE 1

| Sample code | M1 | M2 | M3 | M4 | M5 |
|---|---|---|---|---|---|
| Polybutadiene polyol (MW 2,800 g/mol, 2.5 functional groups) | 100 | 90 | 80 | 70 | 60 |
| Castor oil | 0 | 10 | 20 | 30 | 40 |
| Water | 2 | 2 | 2 | 2 | 2 |
| Amine catalyst (triethylenediamine) | 0.6 | 0.6 | 0.6 | 0.6 | 0.6 |
| Organometal catalyst (stannous octoate) | 1.0 | 1.0 | 1.0 | 1.0 | 1.0 |
| Silicone surfactant (L590 from Air Products) | 1.5 | 1.5 | 1.5 | 1.5 | 1.5 |
| Isocyanate index* | 100 | 100 | 100 | 100 | 100 |
| RT (sec) | 100 | 98 | 98 | 98 | 98 |
| GT (sec) | 125 | 122 | 118 | 115 | 110 |
| State | Good | Good | Good | Good | Good |
| Density (kg/m$^3$) | 40 | 41 | 42 | 43 | 44 |
| Hardness (Asker F) | 50 | 60 | 70 | 80 | 90 |

*Isocyanate equivalents/polyol equivalents (also called NCO index)

A soft urethane foam was prepared according to the method described above except that, while mixing the polyol with castor oil, t-butyl perbenzoate as a peroxide initiator and acrylic acid as an acryl monomer were added as described in Table 2 and then prepared into a sufficiently uniform state by stirring. Through the modification process, a butadiene polyol/castor oil/hydrogenated castor oil (70/25/5) mixture was obtained as a urethane foam composition.

TABLE 2

| Sample code | M31 | M32 | M33 | M34 | M35 |
|---|---|---|---|---|---|
| Polybutadiene polyol (MW 2,800 g/mol, 2.5 functional groups) | 80 | 80 | 80 | 80 | 80 |
| Castor oil | 20 | 20 | 20 | 20 | 20 |
| Water | 2 | 2 | 2 | 2 | 2 |
| Amine catalyst (triethylenediamine) | 0.6 | 0.6 | 0.6 | 0.6 | 0.6 |
| Organometal catalyst (stannous octoate) | 1.0 | 1.0 | 1.0 | 1.0 | 1.0 |
| Silicone surfactant (L590) | 1.5 | 1.5 | 1.5 | 1.5 | 1.5 |
| Peroxide initiator (t-butyl perbenzoate) | 0.2 | 0.2 | 0.2 | 0.2 | 0.2 |
| Acryl monomer (acrylic acid) | 0 | 0.5 | 1.0 | 1.5 | 2.0 |
| Isocyanate index | 100 | 100 | 100 | 100 | 100 |
| RT (sec) | 98 | 98 | 98 | 98 | 98 |
| GT (sec) | 118 | 119 | 118 | 118 | 119 |
| State | Good | Good | Good | Good | Good |
| Density (kg/m$^3$) | 42 | 41 | 42 | 43 | 44 |
| Hardness (Asker F) | 72 | 73 | 74 | 75 | 76 |

[Preparation of Cosmetic Composition]

A foundation described in Table 3 was prepared as follows.

After adding oil phase ingredients and a thickener in an oil phase tank and homogenizing the mixture by heating to 80° C., pigments were added and dispersed. In a water phase tank, water phase ingredients were added and completely melted by heating to 80° C. The resulting mixture was added to the oil phase tank in which the pigments were dispersed. Then, a low-viscosity sunblock emulsion was prepared by emulsifying with a homomixer. After filling the emulsion in a 40-mL container and keeping in a chamber at 25° C. for at least one day, viscosity was measured at 25° C. with a Brookfield LVII viscometer using spindle No. 4 after operation at 30 rpm for 1 minute.

TABLE 3

| | Ingredients (wt %) | Composition 1 | Composition 2 |
|---|---|---|---|
| Oil phase ingredients | Cyclopentasiloxane | 25.0 | 25.0 |
| | Ethylhexyl methoxycinnamate | 7.5 | 7.5 |
| | Ethylhexyl salicylate | 3.0 | 3.0 |
| | Ethylhexanol | 5.0 | 5.0 |
| | Dimethicone | 3.0 | 3.0 |
| | Caprylic/capric triglyceride | 3.0 | 3.0 |
| | PEG-10 dimethicone | 3.0 | 3.0 |
| | Sorbitan sesquioleate | 1.0 | 1.0 |
| | Disteardimonium hectorite | 0.1 | 0.5 |
| Pigments | Titanium dioxide | 5.0 | 5.0 |
| | Mica | 3.0 | 3.0 |
| | Yellow iron oxide | 1.0 | 1.0 |
| | Red iron oxide | 0.2 | 0.2 |
| | Black iron oxide | 0.1 | 0.1 |
| Water phase ingredients | Purified water | To 100 | To 100 |
| | Dipropylene glycol | 5.0 | 5.0 |
| | Salt | 1.0 | 1.0 |
| | Viscosity | 2,000-3,000 cps | 3,000-5,000 cps |

[Soft Urethane Foam Impregnating Material]

Test Example 1

Effect of Impregnation of Cosmetic Product

The surface appearance of the soft urethane foams prepared according to Tables 1 and 2 was not different significantly from the commonly used sponge and were found to be useful to be used as an impregnating material for a cosmetic composition.

The following experiments were conducted to investigate the soft urethane foams suitable to be used as an impregnating material for impregnating a cosmetic composition.

▶ Stability of Cosmetic Composition

After impregnating the cosmetic compositions 1 and 2 with the viscosity controlled using an inorganic thickener into a sponge, the separation of the cosmetic composition in the sponge was observed (for 3 weeks after keeping in a constant-temperature oven at 50° C.).

When the cosmetic compositions 1 and 2 were not impregnated into the sponge, separation of the oil ingredients occurred for both the compositions 1 and 2.

TABLE 4

| Sample code | Ether-type urethane foam | M2 | M3 | M4 | M5 |
|---|---|---|---|---|---|
| Stability of cosmetic composition | Separation occurred in compositions 1 | No abnormality | No abnormality | No abnormality | No abnormality |
| Sample code | | M32 | M33 | M34 | M35 |
| Stability of cosmetic composition | | No abnormality | No abnormality | No abnormality | No abnormality |

As seen from Table 4, the soft urethane foam of the present disclosure showed superior stability without separation of the cosmetic composition whereas the separation of the cosmetic composition occurred in the ether-type urethane foam.

▶ Swelling Phenomenon

After impregnating the cosmetic compositions 1 and 2 in the soft urethane foam, it was investigated whether swelling occurred 3 weeks later.

As can be seen from the following table, the swelling phenomenon was improved with the degree of crosslinking. The larger the sample code number, the greater the degree of crosslinking.

[Table 5]

TABLE 5

| | | Sample code | | | |
|---|---|---|---|---|---|
| | Ether-type urethane foam | M31 | M33 | M34 | M35 |
| Swelling | 5% | 8% | 6% | 5% | 4% |

| | Sample code | | | |
|---|---|---|---|---|
| | M2 | M3 | M4 | M5 |
| Swelling | 10% | 10% | 10% | 10% |

▶ Disintegration or Corrosion (Hydrolysis Resistance)

After impregnating the cosmetic composition sample 2 into a sponge, the change in external appurtenance was observed after keeping in a constant-temperature oven set to 50° C. for 3 weeks. The result is shown in Table 6.

TABLE 6

| Sample code | Ether-type urethane foam (Korea Puff) | M2 | M3 | M4 | M5 |
|---|---|---|---|---|---|
| Hydrolysis resistance (corrosion resistance) | No abnormality | No abnormality | No abnormality | No abnormality | No abnormality |
| Sample code | Ester-type urethane foam (Korea Puff/FoamTech) | M32 | M33 | M34 | M35 |
| Hydrolysis resistance (corrosion resistance) | Disintegration occurred | No abnormality | No abnormality | No abnormality | No abnormality |

The ester-type urethane foam looked intact but was disintegrated when pressed with a finger. In contrast, the ether-type urethane foam and M2-M5 showed no abnormality. In particular, it was confirmed that the urethane foam was stable when the content of castor oil was less than 50 wt % based on the total weight of the polyol used to prepare the soft urethane foam due to good compatibility between the butadiene polyol and the vegetable oil. The urethane foams prepared according to the present disclosure showed no disintegration or collapse with time due to superior hydrolysis resistance.

In particular, they showed improvement in swelling phenomenon as compared to the ether-type urethane foam which is known to have superior corrosion resistance.

[Soft Urethane Foam Puff]

A cosmetic applicator was prepared using the soft urethane foam prepared according to Tables 1 and 2. When applying a cosmetic composition to the skin using an applicator, a foam providing a soft touch tends to have a corrosiveness problem and one with improved corrosiveness tends to feel rather rough. However, the applicator (puff) prepared from the soft urethane foam of the present disclosure could provide soft touch while having strong corrosion resistance.

In particular, the puff of the present disclosure did not show deformation or breaking even after washing.

[Cosmetic Product Packing Material Using Soft Urethane Foam]

A packaging material for packing a cosmetic composition was prepared using the soft urethane foam prepared according to Tables 1 and 2. The soft urethane foam of the present disclosure was suitable for packaging and packing a cosmetic composition due to superior elasticity and strong corrosion resistance. In addition, when used as a material for increasing adhesion to the cap of a container of mascara, it showed excellent elasticity and shape retaining ability.

What is claimed is:
1. A cosmetic product comprising:
   a soft polyurethane foam; and
   a cosmetic composition impregnated in the soft polyurethane foam,
   wherein the soft polyurethane foam is prepared using a polyol, and
   wherein the polyol comprises a polybutadiene polyol selected from the group consisting of cis-1,4-polybutadiene polyol, trans-1,4-polybutadiene polyol, 1,2-polybutadiene polyol and a mixture thereof.
2. The cosmetic product according to claim 1, wherein the polyol has 2-10 hydroxy functional groups and a number-average molecular weight of 100-100,000 g/mol.
3. The cosmetic product according to claim 2, wherein the polyol has 2-3 hydroxy functional groups and a number-average molecular weight of 300-50,000 g/mol.
4. The cosmetic product according to claim 1, wherein the polyol further comprises castor oil.
5. The cosmetic product according to claim 4, wherein the castor oil is less than 50 wt % based on a total weight of the polyol.
6. The cosmetic product according to claim 1, wherein the polyurethane foam is prepared by reacting the polyol with an isocyanate compound, wherein the isocyanate compound is a one or more selected from a group consisting of tolylene diisocyanate (TDI), diphenylmethane diisocyanate (MDI), naphthalene diisocyanate (NDI), xylylene diisocyanate (XDI), isophorone diisocyanate (IPDI), hexamethylene diisocyanate (HMDI) and a derivative thereof.
7. The cosmetic product according to claim 1, wherein the cosmetic composition comprises liquid cosmetic composition.
8. The cosmetic product according to claim 1, wherein the cosmetic cosmetic composition has a viscosity of 1,000-10,000 cPs at 25° C.

* * * * *